United States Patent [19]

Andren et al.

[11] 4,239,934
[45] Dec. 16, 1980

[54] MEANS AND AN APPARATUS FOR SYNCHRONIZING AN ORTHOGONAL DIPHASE CODE RECEIVER

[75] Inventors: Birger L. Andren, Handen; Lars T. E. Svensson, Skärholmen, both of Sweden

[73] Assignee: Telefonaktiebolaget L M Ericsson, Stockholm, Sweden

[21] Appl. No.: 963,206

[22] Filed: Nov. 24, 1978

[30] Foreign Application Priority Data

Dec. 2, 1978 [SE] Sweden ............................ 7713697

[51] Int. Cl.³ ............................................. H04L 7/08
[52] U.S. Cl. ...................................... 375/113; 370/29; 370/109; 375/56; 375/117
[58] Field of Search ................................ 178/67, 69.1; 179/15 BS; 325/320

[56] References Cited

U.S. PATENT DOCUMENTS

| | | | |
|---|---|---|---|
| 3,343,091 | 9/1967 | Bruglemans | 178/67 |
| 3,349,330 | 10/1967 | Wedmore | 178/67 |
| 3,493,679 | 2/1970 | Chomicki | 178/67 |
| 3,936,602 | 2/1976 | Korver | 178/67 |

*Primary Examiner*—David L. Stewart
*Attorney, Agent, or Firm*—Hane, Roberts, Spiecens & Cohen

[57] ABSTRACT

Orthogonal-diphase coded digital signals are transferred in bursts on a transmission line. In order to facilitate synchronization of the signal receiver to the incoming signal bursts an extra pulse is added at the beginning of each transmitted burst, the polarity of this pulse being opposite to that of the following signal element. At the receiver this extra pulse is detected by comparison of the received signals with a threshold voltage and the next zero transition is then used as a basis for the synchronization. The threshold voltage will be self-adaptive if it is allowed to decrease exponentially with time from a start value corresponding to a short transmission line to a final value corresponding to a long transmission line. Furthermore, in order to eliminate DC residuals an extra pulse may be added at the end of each transmitted burst, the polarity of this pulse being opposite to that of the preceding signal element.

6 Claims, 11 Drawing Figures

MODULATOR MO1 (MO2), OUTPUT GATE LG1 (LG2) & LINE CIRCUIT LD1 (LD2)

Fig. 6

DEMODULATOR GATE DG1(DG2) & DEMODULATOR DM1(DM2)
Fig. 8

MEANS AND AN APPARATUS FOR SYNCHRONIZING AN ORTHOGONAL DIPHASE CODE RECEIVER

The present invention relates to a means and an apparatus for synchronizing a receiver, when transmitting digital signals in bursts of orthogonal diphase code, to the phase position of the signals being transmitted on a line from a transmitter.

In order to render two-way data transmission on two-wire connections possible it is common to utilize so called half-duplex traffic, i.e., the transmission is carried out alternately in the two directions. Experiments having been made on utilizing the same principle for transmission of digital speech information on the subscribers' lines in the telephone network by using either PCM or Delta modulation. See for example the report "Application of Delta Modulation in the Telephone Subscriber' Network" by J. E. Flood and C. R. J. Shurrock from Zürich Seminar of 1972. In PCM, as known, the speech signals are sampled at the frequency 8 kHz after which the quantizid amplitude value is expressed in 8-bit code. In Delta modulation the sampling is carried out at a 64 kHz rate, the change in amplitude between two consecutive samples in principle being indicated by the polarity of one single bit. Thus both systems require an effective transmission rate of 64 kbit/s per telephone channel in each transmission direction. With the alternating transmission, however, the digital signals will be transmitted in bursts at increased bit rate. Each burst can be given an arbitrary length within the range for that delay which can be accepted by the subscribers. However, considering the costs for buffering the signals between each transmission and receiving occasion the length of the burst should be limited.

The principal demands for the transmission equipments at the telephone exchange and at the subscriber's end respectively are low costs and a simple installation for varying line types and line lengths. These demands more specifically mean:

(a) The transmitted signals shall be simple to generate and to detect;
(b) It shall be able to perform the line connection without considering polarity;
(c) The transmission shall not require galvanic connection; and
(d) No trimming shall be required considering different lines.

The points a, b and c are satisfied if the digital signals are transmitted on the line in a so-called orthogonal diphase code. This code is characterized by the fact that a binary signal is transmitted by means of alternating positive and negative signal elements whereby one of the binary states is represented by two oppositly directed signal elements each having a length which is half of the length of one unit element of the binary signal while the other binary state is represented by one single element the length of which is equal to the length of the unit element. The point d, on the other hand, involves a problem concerning the synchronization of the receiver to the transmitted signal bursts so that safe detection of the binary information contents is rendered possible. The problem is caused by the fact that the signal level of the received signals from long transmission distances will be considerably lower than the level of the transmitted signals from the same line end. In order to have reception which is not disturbed by reflections from the transmitted signals it is therefore important that the line is matched as well as possible to its characteristic impedance. This is relatively easy to achieve for a limited frequency band, especially for higher frequencies where the deviation in characteristic impedance is small among different line types. Furthermore the transmission attenuation on cable connections is lowest at low frequencies where the low frequency reflections will be the most annoying. Consequently it is important that the share of the low frequency components in the transmitted signals be small. In principle this is satisfied by the orthogonal diphase code. But the share of low frequency components will increase when the code pattern is split up into bursts of a limited length something which moreover is relevant for all types of polarity independent codes. Considering the occurrence of reflections and other disturbances, the signal detection in the receiver must be based on comparison of the received signals with threshold levels. However, due to the varying degree of pulse distortion on different lines it is difficult to achieve a careful phase synchronization of the detector circuits of the receiver without an individual adjustment. It is the object of the present invention to offer a solution of this problem. The invention, the characteristics of which appear from the claims, will be described more in detail below by means of an embodiment and with reference to the accompanying drawing.

Figure 1:
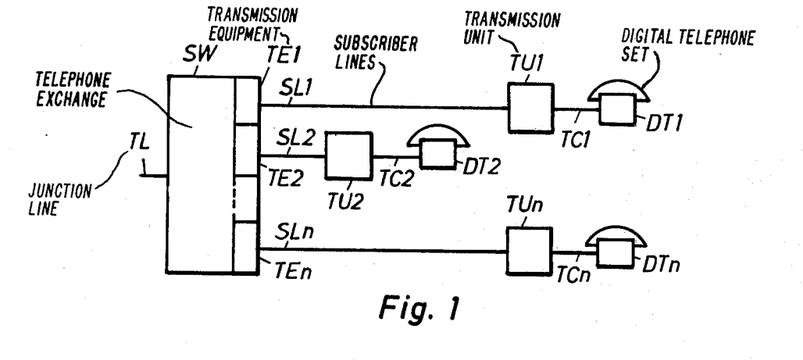
FIG. 1 is a block diagram of a system in which the invention can be used.
Figure 2:
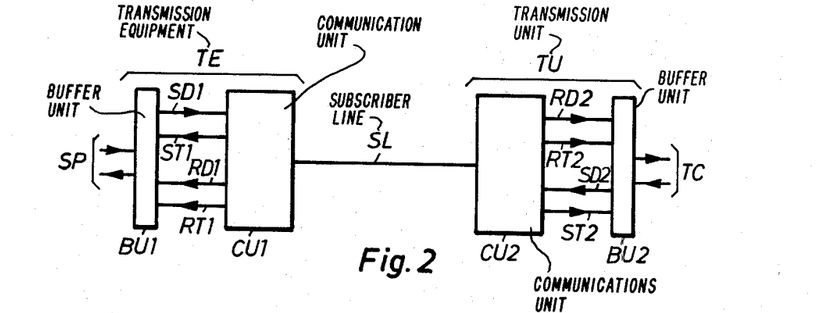
FIG. 2 is a block diagram which shows a part of the system in FIG. 1.

The system shown in FIG. 1 comprises a telephone exchange SW for establishing connections between one or several junction lines TL and the subscribers' lines SL1-n and a number of subscribers' equipments consisting of digital telephone sets DT1-n and associated transmission unit TU1-n. The function of the latter is subordinate to corresponding transmission equipments TE1-n included in the telephone exchange SW. The transmission of the digital signals on the junction line TL and on the telephone connections TC1-n is supposed to be carried out according to European PCM-standard which means 4-wire transmission at the rate of 64 kbit/s. The subscribers' lines SL1-n are two-wire lines and therefore the signals must be transmitted alternately in the two directions at a higher bit rate and in bursts of a specified length. According to the chosen embodiment the transmission rate on the subscribers' lines is 256 kbit/s and each burst comprises eight information bits. In order to accomplish the conversion between the two transmission modes the transmission units TU1-n as well as the transmission equipments TE1-n are provided with buffers. This is illustrated in FIG. 2 which shows a transmission equipment TE consisting of the buffer unit BU1 and the communication unit CU1 and a transmission unit TU consisting of the buffer unit BU2 and the communication unit CU2 which are connected through a subscriber's line SL. The transmission equipment TE communicates with the switching part of the telephone exchange SW through the circuit SP; and the transmission unit TU communicates with the digital telephone set DT through the circuit TC. Thus, according to the previously mentioned facts, this communication is performed by means of a continuous bit stream having a rate of 64 kbit/s in each direction. The transmission in either direction between a buffer unit BU1, BU2 and the corresponding communication unit CU1, CU2 is performed, according to the previously mentioned, in bursts having the rate of 256 kbit/s and being controlled from the respective communication unit. Thus the bit bursts are transmitted from the buffer unit BU1 to the communication unit CU1 through the path SD1 supervised by control signals on the path ST1 and from the communication unit CU2 to the buffer unit BU2 through the path RD2 supervised by control signals on the path RT2. In the opposite direction the bit bursts are transmitted through the paths SD2 and RD1 supervised by control signals on the paths ST2 and RT1 respectively. The alternating transmission on the subscriber's line SL is illustrated in FIG. 3 where in the upper row the process at the transmission equipment TE is shown and in the lower row the process at the transmission unit TU.

Figure 3:
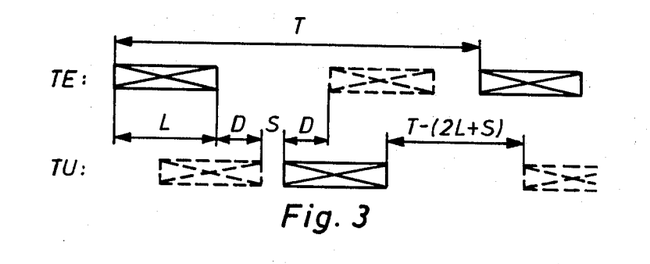
FIG. 3 is a time diagram which shows the main principle for the alternating transmission in the system part according to FIG. 2.

According to FIG. 3 bursts having the length L and the period T (continuous symbols) are transmitted from the transmission equipment TE. The bit bursts arrive at the transmission unit TU with the delay D (dashed symbols). A certain interval S after the reception of a bit burst, a bit burst having the same length L is transmitted from the unit TU in the opposite direction and this is received by the equipment TE with the same delay D. It appears from the Figure that the time interval between transmission and reception at the transmission unit TU is constant. At the transmission equipment TE, however, the corresponding time interval is a function of the propagation time delay D which in its turn is directly proportional to the length of the subscriber's line SL.

Figure 4:
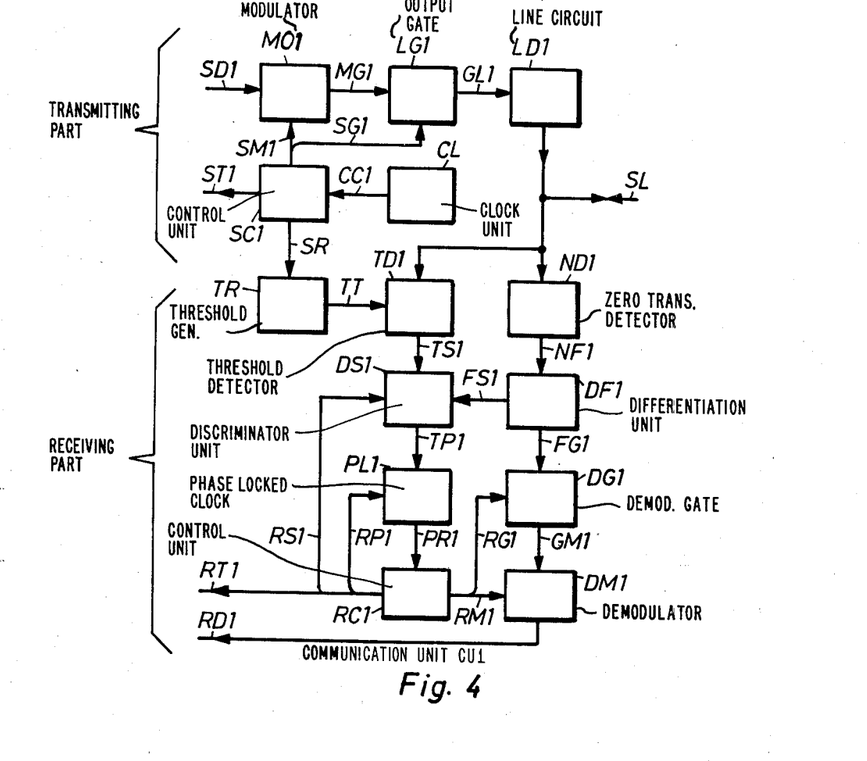
FIGS. 4 and 5 are block diagrams of the two main parts of the system part in FIG. 2.

In FIG. 4 an embodiment of the communication unit CU1 is shown which is included in the transmission equipment TE. The unit CU1 consists of a transmitting part containing a modulator MO1, an output gate LG1, a line circuit LD1, a control unit SC1 and a clock unit CL and a receiving part containing a threshold generator TR, a threshold detector TD1, a zero transition detector ND1, a discriminator unit DS1, a differentiation unit DF1, a phase locked clock PL1, a demodulator gate DG1, a control unit RC1 and a demodulator DM1. The control unit SC1 receives on the path CC1 from the clock unit CL a clock signal having the frequency 512 kHz and forms from this a number of different control signals of different frequencies on the paths SR, ST1, SM1 and SG1. Depending on the signals on the path ST1 binary data signals arrive at the modulator MO1 where they are converted according to the orthogonal diphase code. Through the path MG1 the data signals are then transmitted to the output gate LG1 where they are provided with a starting pulse and a finishing pulse, each having a duration of half a data bit and having such a polarity that the resulting bit burst will be DC balanced. The bit burst is transmitted through the path GL1 to the line circuit LD1 when they are converted into bipolar shape before being transmitted on the subscriber's line SL.

After a certain time 2D+S (according to FIG. 3) a bit burst arrives on line SL connected to the two detectors TD1 and ND1. It is assumed that the system is synchronized so that the control signals being emitted by the control unit RC1 on the paths RT1, TS1, RP1, RG1 and RM1 are correctly related to the incoming data bits. The threshold generator TR also emits on the path TT a threshold voltage which is utilized by the threshold detector TD1 to distinguish the data signals being transmitted on the line SL from the remote end from reflected signals deriving from the data signals being transmitted from the line circuit LD1. (Note generator TR is controlled by signals on line SR from control unit SC1 of the transmitting part.) The data signals being transmitted from the remote end as well as the reflected data signals are submitted to attenuation which, according to what is known already, increases exponentially with the time interval between transmission and reception. An automatic adaptation of the threshold voltage to the line length and thus to the expected level of the incoming signals is consequently obtained if the threshold voltage is caused to decrease mainly exponentially with the time so that the instantaneous value exceeds the amplitude of the reflections but is lower than the amplitude for each line length of the signals being transmitted from the remote end. Detected signals are indicated on the output path TS1 connected to the discriminator unit DS1.

The signals being received on the line SL are also fed to the zero transition detector ND1 which emits a signal on the output line NF1 connected to the differentiation unit DF1 each time the received signals pass through the zero level. From the unit DF1 short pulses are fed to the discriminator DS1 and to the demodulator gate DG1 for each zero transition via the output paths FS1 and FG1, respectively. In the discriminator unit DS1 the first pulse occurring on the path FS1 after the first indication being received on path TS1 is detected so that a synchronizing pulse is emitted on the output path TP1 to the phase locked clock PL1. The time position of this synchronizing pulse shall correspond with the time position of the reference signal which is received on the path RP1. For deviations an adjustment of the phase position of the clock is made. The pulses appearing on the path FG1 are conducted by the gate unit DG1 through path GM1 to the demodulator DM1 where the original data signals are reformed and after that fed out on the path RD1. The operation of the arrangement being described here will be further illustrated by means of the time diagrams of FIGS. 9–11.

Figure 5:
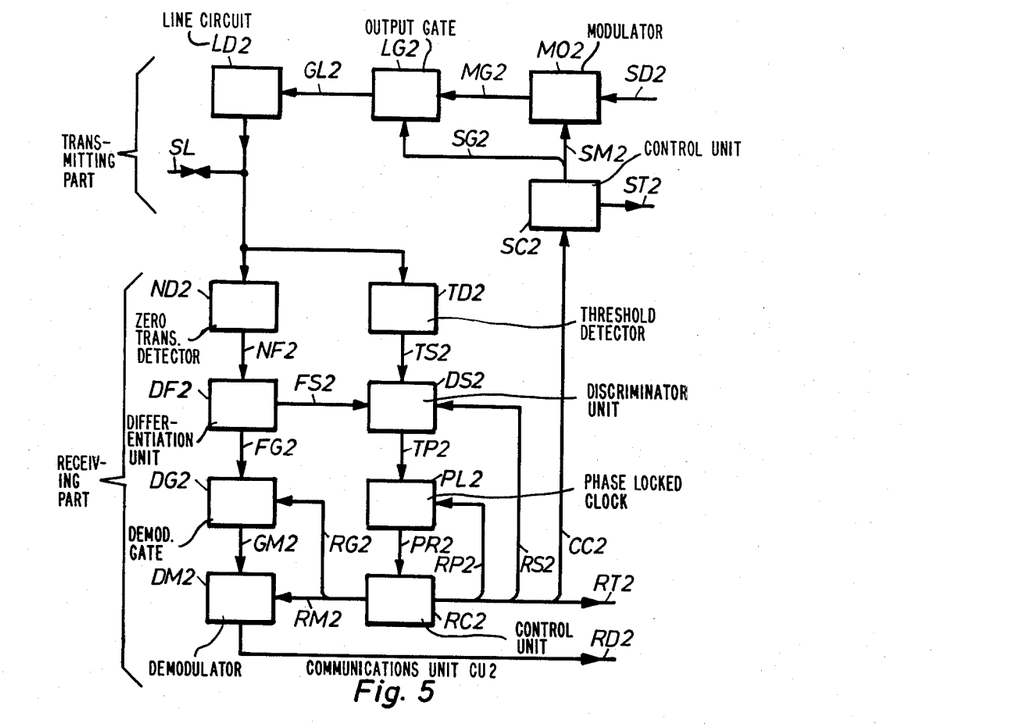

In FIG. 5, there is shown an embodiment of the communication unit CU2 which is included in the transmission unit TU. All blocks being illustrated in FIG. 4 apart from the blocks CL and TR are also included in FIG. 5. Thus the function of the units MO2, LG2, LD2, etc. is the same as of the units MO1, LG1, LD1, etc. of FIG. 4. In the same way the signal paths have their direct correspondence in both arrangements to the extents that they are provided with a designation. As the time interval between transmission and reception in the unit CU2 is constant no special arrangement is required for adaptation of the threshold level to the threshold detector TD2. It is assumed that a specific threshold voltage is used in the unit TD2. As, furthermore, the communication unit CU2 is subordinated to the communication unit CU1 no clock unit of the transmitting part is required but the clock signal can be fed to the control unit SC2 through the path CC2 from the control unit RC2.

Figure 6:
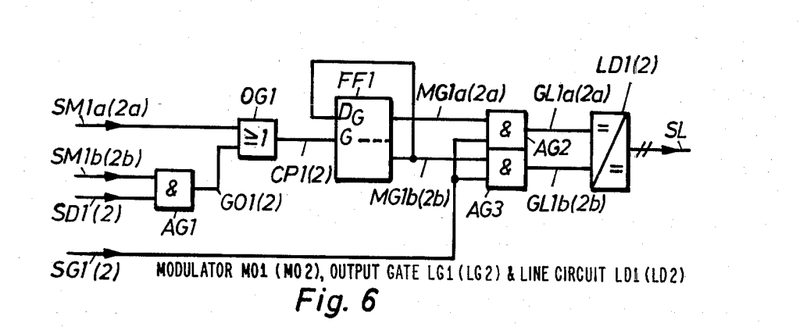
FIGS. 6, 7 and 8 are logic diagrams which show how some of the blocks in FIGS. 4 and 5 can be realized.
Figure 7:
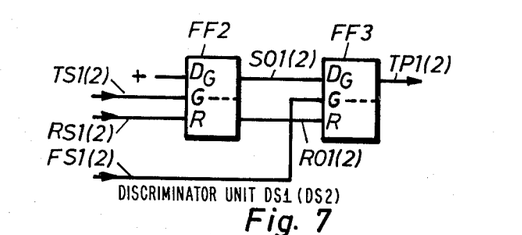
Figure 8:
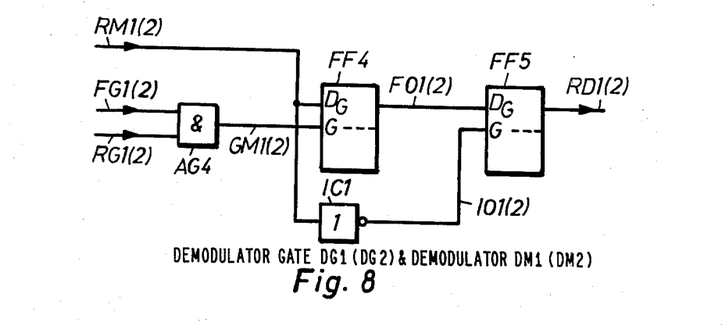

The FIGS. 6, 7 and 8 show embodiments of some of the units in FIG. 4 (and corresponding units in FIG. 5). The arrangement in FIG. 6 refers to the modulator MO1 (MO2), the output gate LG1 (LG2) and the line circuit LD1 (LD2) and it comprises three AND-gates AG1, AG2, AG3, an OR gate OG1, a bistable flip-flop FF1 and a level converter LD1 (LD2). The arrangement in FIG. 7 refers to the discriminator unit DS1 (DS2) and it comprises two bistable flip-flops FF2, FF3. The arrangement in FIG. 8 refers to the demodulator gate DG1 (DG2) and the demodulator DM1 (DM2) and it comprises and AND-gate AG4, an inverter ICI and two bistable flip-flops FF4, FF5. A closer description of the rest of the units included in FIGS. 4 and 5 should not be necessary as their design clearly appear below from the description of their way of working in connection to FIGS. 9-11.

Figure 9:
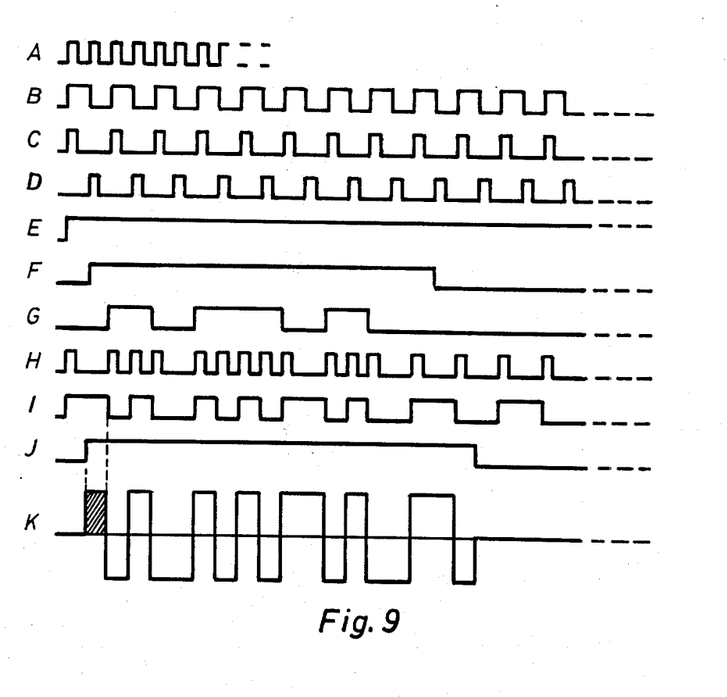
FIGS. 9, 10 and 11 are time diagrams which illustrate the operation of the arrangements shown in FIGS. 4-8.

In FIG. 9 the operation of the transmitting part of, for example, the communication unit CU1 shown in FIG. 4 is illustrated. The pulse train on line A represents the clock signal having the frequency 512 kHz which is emitted on path CC1 from the clock unit CL. The signals on the lines B-F are formed in the control unit SC1. The signal according to line B is transmitted as a bit time signal together with the gate signal according to line F on path ST1 to the buffer unit BU1 (FIG. 2) and accomplishes according to line G transmission of data signals on the path SD1 during the positive part of the gate signal which according to the embodiment has the length of eight bit intervals. The signals according to the lines C and D are transmitted on path SM1 to the modulator MO1, the inputs SM1a and SM1b in FIG. 6. The signal in line E is a square-wave signal having the frequency 8 kHz which is shown in its entirety in FIG. 11. Its task is to internally determine in the control unit SC1 the periodicity of the transmission interval.

The pulses in line C are fed to the input SM1a in FIG. 6 and all reach the output CP1 from the OR-gate OG1. The pulses in line D arrive on the input SM1b and can only pass the AND-gate.

AG1 for a high level on the data input SD1. The resulting pulse train on the gate output CP1 is shown in line H in FIG. 9. This pulse train triggers the bistable flip-flop FF1 and generates the signal on the flip-flop output MG1a being shown in line I as well as an inverted version of the same signal on the flip-flop output MG1b. On the input SG1 from the control unit SC1 a control signal is obtained, according to line J, to the two AND-gates AG2, AG3 which forward the signals on the paths MG1a, MG1b through the outputs GL1a, GL1b to the level converter LD1. The bipolar output signal of this level converter to the subscriber's line SL is shown in line K. The control signal in line J has the length of nine bit intervals and has such a phase position in comparison to the signal in line I that the resulting signal in line K will comprise a starting pulse and a finishing pulse, each having the length of half a bit interval, apart from the signal elements corresponding to the eight data bits. As appears from FIG. 9 a binary one (high level in line G) corresponds to two signal elements having opposite polarity with the duration of half a bit interval while a binary zero corresponds to a signal element having the duration of one bit interval. The complete bit burst on the output SL is always DC balanced independent on the bit sequence being received on the input SD1. This characteristic is favorable for the detection of the signals.

Figure 10:
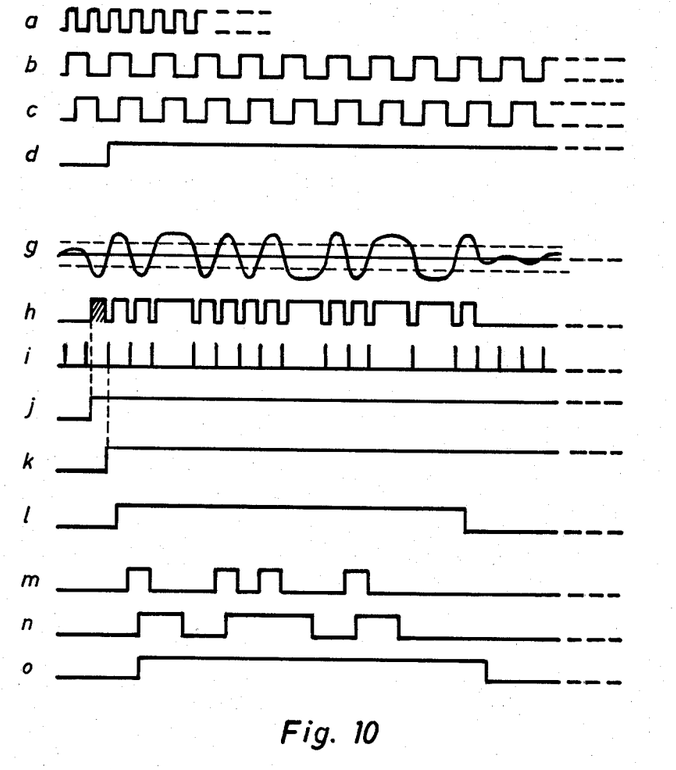
Figure 11:
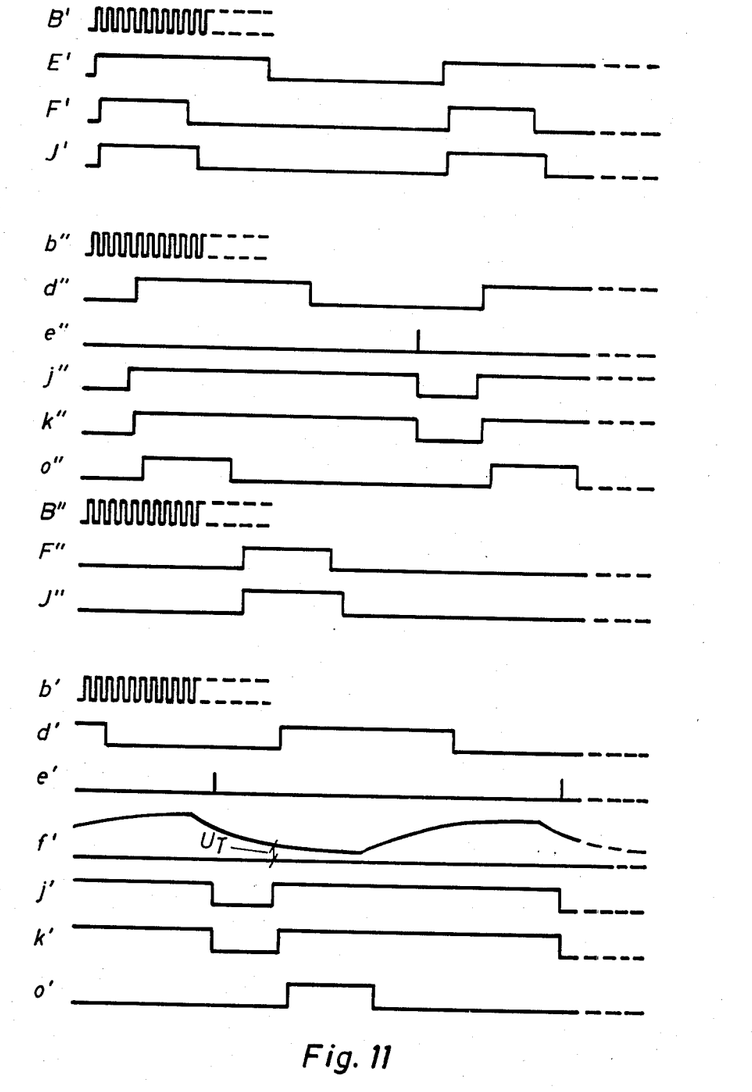

In FIG. 10 the operation of the receiving part, for example, of the communication unit CU2 shown in FIG. 5, is illustrated. It is assumed that the receiver has had the occasion to synchronize to the incoming data signals so that the control signals from the control unit RC2 have the correct phase position. The pulse train in line a in FIG. 10 represents the clock signal having the frequency 512 kHz which is emitted on path PR2 from the phase-locked clock PL2 to the control unit RC2. The signal in line b is formed by frequency dividing the signal a and it is transmitted after inversion as a bit time signal on path RT2 to the buffer unit BU2 (FIG. 2). The signal in line c is formed from the signal b by a delay of half a clock period and it is transmitted on path RM2 to the demodulator DM2. The signal in line d is a square-wave signal having the frequency 8 kHz which is shown in its entirety in FIG. 11. It is transmitted as a phase reference to the phase locked clock PL2 through path RP2. In line g an example is shown how an incoming bit burst can look after being transmitted on the line SL. The threshold levels for the threshold detector TD2 have also been illustrated with dashed lines. According to what has been already mentioned for the communication unit CU2 the arrival time for the received bit bursts always is at the same interval from the transmission time for a bit burst from the same communication unit independent on the line length. Therefore it is possible in this unit to choose a predetermined threshold level for positive and negative amplitude values. On the output TS2 from the threshold detector TD2 a signal according to line h in FIG. 10 is obtained which consequently shows a high level during the intervals when the absolute value of the input signal exceeds the absolute value of the threshold level. The same input signal is also fed to the zero transition detector ND2 on the output NF2 of which a signal is obtained similar to the one in line h when the bipolar input signal passes through the zero level. This signal is differentiated in the unit DF2 which on the outputs FG2 and FS2 emits indication pulses according to line i to the demodulator gate DG2 and the discriminator unit DS2 respectively. An embodiment of the latter unit is shown in FIG. 7. In the starting position the outputs SO2 and TP2 from the two bistable flip-flops FF2 and FF3 show respectively a low level while the output RO2 shows a high level. The first positive pulse on the input TS2 (according to line h in FIG. 10) switches over the bistable flip-flop FF2 so that the outputs SO2, RO2 change states. The following first pulse on the input FS2 (according to line i) then switches over the bistable flip-flop FF3 so that the output TP2 changes state. The states on the outputs SO2 and TP2 are shown in the lines j and k respectively in FIG. 10. The output TP2 is connected to the phase locked clock PL2 which on its second input RP2 receives the 8 kHz signal according to line d. The phase position of the two signals are compared and if there is a deviation a corresponding correction of the phase position of the clock is made. By means of a positive pulse on the input RS2, which is shown in FIG. 11, the bistable flip-flop FF2 is reset to its original starting position. The flip-flop in its turn causes a reset of the bistable flip-flop FF3 through the output RO2. The demodulator gate DG2 in FIG. 5 corresponds to the AND-gate AG4 in FIG. 8. The gate signal being shown in line 1 in FIG. 10 is fed to the input RG2 so that only those pulses according to line i which come on path FG2 during the duration of the gate signal on path RG2 are carried on to path GM2 to the demodulator DM2 which corresponds to the rest of the circuits in FIG. 8. The bistable flip-fflop FF4 is set by means of the pulses on path GM2 to that binary state which at the same time is received on path RM2, that is in accordance with the signal in line c in FIG. 10. As a result the signal being shown in line m is obtained on path FO2. The signal on path RM2 is inverted in the inverter IC1 and is used to switch over the bistable fip-flop FF5 in accordance with the state on path FO2 whereby the data signal being shown in line n is obtained on the output RD2. Finally in line o a control signal is shown which together with the already mentioned bit time signal (the signal according to line b inverted) is fed out on path RT2. The positive part of the control signal according to line o indicates the duration of the eight data bits in the data signal according to line n (compare line G in FIG. 9).

FIG. 11 is a time diagram showing the connection between the functions in the two communication units CU1 and CU2 for a complete transmission cycle. The signals relating to the unit CU1 are indicated with prime signs (') and the signals relating to the unit CU2 with double prime signs ("). Otherwise the letter designations correspond with those in FIG. 9 and FIG. 10. In line B' in FIG. 11 consequently the bit time signal is shown which is emitted on path ST1 from the communication unit CU1 to the buffer unit BU1. In line E' the 8 kHz signal is shown which decides the operating cycle for the transmitting part of the unit CU1. The signal in line F' is the gate signal being emitted together with the bit time signal on path ST1 and the signal in line J' is the signal deciding the length of the bit burst being fed out to the subscriber's line SL. In line b" that signal is shown which in an inverted version is emitted as a bit time signal on path RT2 from the communication unit CU2 to the buffer unit BU2. On line d" the 8 kHz signal is shown which constitutes the phase reference for the phase locked clock PL2 (path RP2). The signal in line e" is a reset signal formed by the control unit RC2 which is transmitted to the discriminator unit DS2 through path RS2 to prepare this unit for the next bit burst which should occur in connection with the next positive flank of the signal in line d". The preparation consists in the bistable flip-flops FF2 and FF3 in accordance with the lines j" and k" being reset to their starting positions (low level). The demodulated signals are emitted to the buffer unit BU2 on path RD2 at the same time as the control signal according to line o" is emitted on path RT2. After that the return transmission from the communication unit CU2 starts. This is illustrated by means of the bit time signal according to line B" and the control signal according to line F", which through path ST2 controls the data signal fetching from the buffer unit BU2, and the gate signal according to line J", which decides the size of the bit burst being transmitted to the subscriber's line SL. Here it shall be observed that the return transmission is started at a time which is permanently related to the signal in line d" and is placed as closely after the end of the reception process as can be suitable with reference to the risk for interference. The bit time signal emitted on path ST2 is formed by means of that clock signal which on path CC2 is transmitted from the control unit RC2 of the receiving part to the control unit SC2 of the transmitting unit and therefore has the same phase position as the signal being shown in line b". The receiving operation in the communication unit CU1 which is illustrated in the lines b'-o' is identical with what has been described in connection. The only lines b"-o" with the difference is that one more signal has been shown in line f'. This signal is a threshold voltage which is generated in the unit TR when controlling a signal which is fed on path SR from the control unit SC1 and is delivered to the threshold detector TD1. The control signal on path SR can, for example, be made of a square-wave voltage altering between a high level corresponding to a highest threshold voltage and a low level corresponding to a lowest threshold voltage. The threshold generator TR can be made of an integration circuit which forms the shown signal from the square-wave voltage. The altering points are chosen in such a way that the threshold voltage starts its decrease immediately after each transmission interval, i.e. after the signal in line J' has switched to a low level. The level $U_T$ being indicated in line f' is that threshold voltage which is emitted on path TT to the threshold detector TD1 when the first signal element in the incoming bit burst is to be detected. The threshold generator TR delivers in such a way a threshold voltage which automatically is adapted to the actual transit time on the line and consequently also to the receiving level for the bit burst being transmitted from the communication unit CU2. In this manner a protection against disturbance of the reception in the unit CU1 is obtained due to reflections from the signals being transmitted from the same unit as the level of the reflections is in the same relation to the time interval between transmission and reception as the level of the transmitted signals.

We claim:

1. In a communication system which transfers bursts of digital signals by means of orthogonal diphase code, the method of synchronizing a receiver to the phase position of the signals being transmitted on a line from a transmitter comprising the steps of: (1) in each burst of signals providing a starting pulse having a polarity which is opposite to the polarity of the following signal element, (2) detecting in the receiver said starting pulse by comparison of the levels of the incoming signals arriving at the receiver with a threshold value, and (3) generating a synchronizing signal for the receiver in response to the first zero transition of received signals following said starting pulse.

2. The method according to claim 1, further comprising automatically adapting the threshold value for transmission at varying distances to the expected level of the incoming signals arriving at the receiver.

3. The method according to claim 1, further comprising the step of providing a finishing pulse to each burst of signals, the polarity of the finishing pulse being opposite to the polarity of the last signal element of the respective burst.

4. In a communication system which transfers from a transmitter, via a communications link, to a receiver bursts of digital values represented by orthogonal diphase coded signals, apparatus for synchronizing the receiver to the phase position of the signals transmitted onto the communications link from the transmitter, comprising: in the transmitter, generating means for generating the orthogonal diphase coded signals as signal elements representing the bursts of digital values, burst period establishing means for generating a signal which starts just before the generation of a burst of digital values by said generating means and lasts to the end of the burst, and gating means receiving the signals from said generating means and said burst period establishing means for generating a starting signal element for each burst, said starting signal element preceeding the first signal element of the burst and having a signal polarity opposite thereto; and, in the receiver, a synchronizable clock circuit means for establishing the operation times of the receiver in response to a synchronizing signal, an input terminal connected to the communications link, threshold means connected to said input means for emitting a signal each time the signal at said input terminal exceeds a predetermined level, zero transition detecting means for emitting a pulse each time the signal at said input terminal passes through a zero level, and discrimination means connected to said threshold means and said zero transition detecting means for transmitting a synchronizing signal to said synchronizable clock circuit means in response to the first pulse emitted by said zero transition detecting means after the emission of the first signal by said threshold means.

5. The apparatus of claim 4 wherein said threshold means includes means for monotonically decreasing the predetermined level from a first valve to a second value in anticipation of the receiver receiving the bursts.

6. The apparatus of claim 4 or 5 further comprising in the transmitter means for appending each burst of signal elements with a finishing signal element which has a signal polarity opposite the preceeding signal element.

* * * * *